United States Patent Office 3,146,248
Patented Aug. 25, 1964

3,146,248
ENDBLOCKED POLYSILANES
Richard W. Alsgaard, Henry Nelson Beck, and Edwin P. Plueddemann, Midland, Mich., assignors to Dow Corning Corporation, Midland, Mich., a corporation of Michigan
No Drawing. Filed Oct. 25, 1960, Ser. No. 64,957
1 Claim. (Cl. 260—448.2)

This invention relates to novel endblocked polysilanes.

It is the primary object of this invention to provide novel polysilanes which are useful as fuels for rocket propellants. The polysilanes defined below when burned with an oxidizing agent have a higher specific impulse than that of corresponding alkyl substituted polysilanes or than hydrocarbon compositions. Another object is to produce novel explosives. Other objects and advantages will be apparent from the following description.

This invention relates to polysilanes consisting essentially of molecules of the structure $$R_3Si(Si)_xSiR_3$$
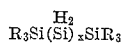

in which R is selected from the group consisting of methyl radicals and hydrogen atoms, at least one R per silicon being methyl and $x$ is an integer of at least 1.

The compositions of this invention are best prepared by reacting a mixture of dichlorosilane and a silane of the formula $R_3SiCl$ where R is as above defined with an alloy of sodium and potassium ranging in composition from about $Na_2K$ to about $K_2Na$ at a temperature below 50° C.

For the purpose of this invention it is essential that the reaction of the silanes with the alkali metal be carried out at a low temperature. This prevents decomposition of the desired product. It is also essential to carry out the reaction in the absence of oxygen. This can be done by blanketing the reaction mixture with an inert gas such as nitrogen, argon, helium and the like.

The reaction is best carried out in the presence of a hydrocarbon medium such as benzene, toluene, xylene, heptane, or other aliphatic hydrocarbons.

For the purpose of this invention the dichlorosilane can be copolymerized with trimethylmonochlorosilane, dimethylmonochlorosilane or methylmonochlorosilane.

It is essential that there be at least one methyl group and preferably two on each silicon at the ends of the molecule. Otherwise, the compositions are unstable and deteriorate to produce silane.

The compositions of this invention are easily oxidized and should be handled at all times in the absence of oxygen. However, these materials are stable in the presence of an oxidizing agent such as ammonium perchlorate provided the temperature does not exceed about 100° C. When burned in the presence of an oxidizing agent these silanes give very high specific impulse and are superior to other types of silanes.

The use of these materials as propellants and the compositions of said propellants are fully described and claimed in the applicants' copending application Serial Number 64,953, entitled "Rocket Propellants," filed concurrently herewith, the entire disclosure of said application being hereby incorporated in this application by reference.

For use as rocket fuel propellants the compositions of this invention should be in the form of soluble fluids or waxy materials which can be vulcanized to rubbery solids. Ideally the materials should melt below 100° C. However, for use as explosives it is not necessary that the materials be in the form of soluble, liquid or waxy materials but may be in the form of insoluble, dry powders.

The term "consisting essentially of" as employed herein means that the materials are essentially of the compositions shown but they may contain small amounts of unreacted chlorine or traces of oxygen which do not materially affect the properties of the compositions.

The following examples are illustrative only and should not be construed as limiting the invention which is properly delineated in the appended claim.

The abbreviation Me is employed herein for the methyl radical.

Example 1

A mixture of 46.9 g. of potassium, 14 g. of sodium, 26.4 g. of rock salt and 310 ml. of heptane were heated and agitated under a nitrogen atmosphere. This resulted in the formation of a finely dispersed liquid alloy of the composition $K_2Na$.

The mixture was cooled to room temperature and a mixture of 16.58 g. of dimethylmonochlorosilane and 91.2 g. of dichlorosilane was added over a period of 2 hours. During the addition the temperature was maintained below 33° C. The reaction mixture was stirred overnight at room temperature and then filtered. The solid material was washed with heptane and the washings added to the original filtrate. The solvent was removed from the filtrate by heating at a temperature of 30 to 40° C. at 1 mm. pressure. All of the above procedure was carried out under a nitrogen atmosphere.

There was obtained 6.6 g. of a cloudy, yellow liquid which by analysis was shown to have a silicon-bonded hydrogen content of 5.3% by weight as compared with a calculated value of 5.3%.

The yellow liquid had the formula $$HMe_2Si(Si)_xSiMe_2H$$
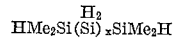

where $x$ has an average value above 10.

Example 2

104.3 g. of potassium was placed in 400 ml. of toluene and the mixture was heated to melt the potassium. A mixture of 49 g. of trimethylmonochlorosilane and 110.5 g. of dichlorosilane was then added over a period of 1 hour and 13 minutes. The mixture was then heated for 4 hours longer and allowed to stand overnight. During the reaction there was extensive decomposition as indicated by the evolution of silane.

The solvent was then evaporated and there was obtained 6 g. of a liquid product having the formula $$Me_3Si(Si)_xSiMe_3$$
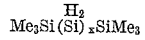

in which $x$ has an average value greater than 1.

The entire procedure was carried out under a nitrogen atmosphere.

Example 3

Equivalent results are obtained when the alloy $Na_2K$ is employed in the procedure of Example 1.

That which is claimed is:

As a composition of matter a polysilane consisting essentially of molecules of the formula $$R_3Si(Si)_xSiR_3$$
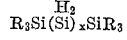

in which R is selected from the group consisting of methyl radicals and hydrogen atoms, at least one R per silicon being methyl, and $x$ has a value of at least 1.

References Cited in the file of this patent

UNITED STATES PATENTS

| | | |
|---|---|---|
| 2,554,193 | Hunter | May 22, 1951 |
| 2,554,976 | Burkhard | May 29, 1951 |
| 2,612,458 | Stedman | Sept. 30, 1952 |
| 2,777,772 | Stedman | Jan. 15, 1957 |
| 2,923,633 | Stedman | Feb. 2, 1960 |